United States Patent
Eppe et al.

(10) Patent No.: US 7,092,244 B2
(45) Date of Patent: Aug. 15, 2006

(54) CONNECTION OR DISTRIBUTING DEVICE FOR ELECTRICAL INSTALLATION EQUIPMENT

(75) Inventors: Klaus-Peter Eppe, Waldbrunn (DE); Alexander Orban, Weinheim (DE)

(73) Assignee: ABB Patent GmbH, Ladenburg (DE)

( * ) Notice: Subject to any disclaimer, the term of this patent is extended or adjusted under 35 U.S.C. 154(b) by 0 days.

(21) Appl. No.: 10/501,533

(22) PCT Filed: Jan. 18, 2003

(86) PCT No.: PCT/EP03/00465

§ 371 (c)(1),
(2), (4) Date: Jul. 16, 2004

(87) PCT Pub. No.: WO03/067725

PCT Pub. Date: Aug. 14, 2003

(65) Prior Publication Data

US 2005/0117281 A1    Jun. 2, 2005

(30) Foreign Application Priority Data

Feb. 7, 2002    (DE) ................................ 102 04 934

(51) Int. Cl.
*H02B 1/04* (2006.01)

(52) U.S. Cl. ...................... 361/641; 361/628; 361/637; 361/640; 200/296

(58) Field of Classification Search ........ 361/627–636, 361/639–647, 657, 658; 174/95; 200/293–297
See application file for complete search history.

(56) References Cited

U.S. PATENT DOCUMENTS

| | | | | |
|---|---|---|---|---|
| 3,767,977 A | * | 10/1973 | Bachman ..................... | 361/656 |
| 5,486,979 A | * | 1/1996 | Bowen et al. ............... | 361/640 |
| 5,640,294 A | * | 6/1997 | Caggiano et al. ........... | 361/637 |
| 5,721,672 A | * | 2/1998 | Costa et al. ................. | 361/801 |
| 5,745,338 A | * | 4/1998 | Bartolo et al. .............. | 361/637 |
| 6,246,004 B1 | * | 6/2001 | Faccin ......................... | 174/95 |

FOREIGN PATENT DOCUMENTS

| | | |
|---|---|---|
| EP | 0651481 A | 5/1995 |
| EP | 1003258 A | 5/2000 |

\* cited by examiner

*Primary Examiner*—Boris Chervinsky
(74) *Attorney, Agent, or Firm*—Buchanan Ingersoll PC

(57) ABSTRACT

A connection device or distribution equipment for electrical installation equipment, which can be built into installation equipment, preferably a household distribution box, in which the electrical connection between two bus bars (21, 31) built into a household distribution box (10) is produced by an electrical line connector (40) which runs in the interspace between the two base housings (20, 30) containing the bus bars (21, 31) and the back wall (11) of the household distribution box (10). Connection contact pieces (42a, 42b, 42c) are provided at both ends of the line connector (40), and can be brought into engagement by vertical introduction into the plug sockets (13) located on the upper edges (23, 33) of the base housings (20, 30), whereby the electrical contact is produced between the first bus bar (21) and the second bus bar (31).

14 Claims, 3 Drawing Sheets

CONNECTION OR DISTRIBUTING DEVICE FOR ELECTRICAL INSTALLATION EQUIPMENT

Figure 1:
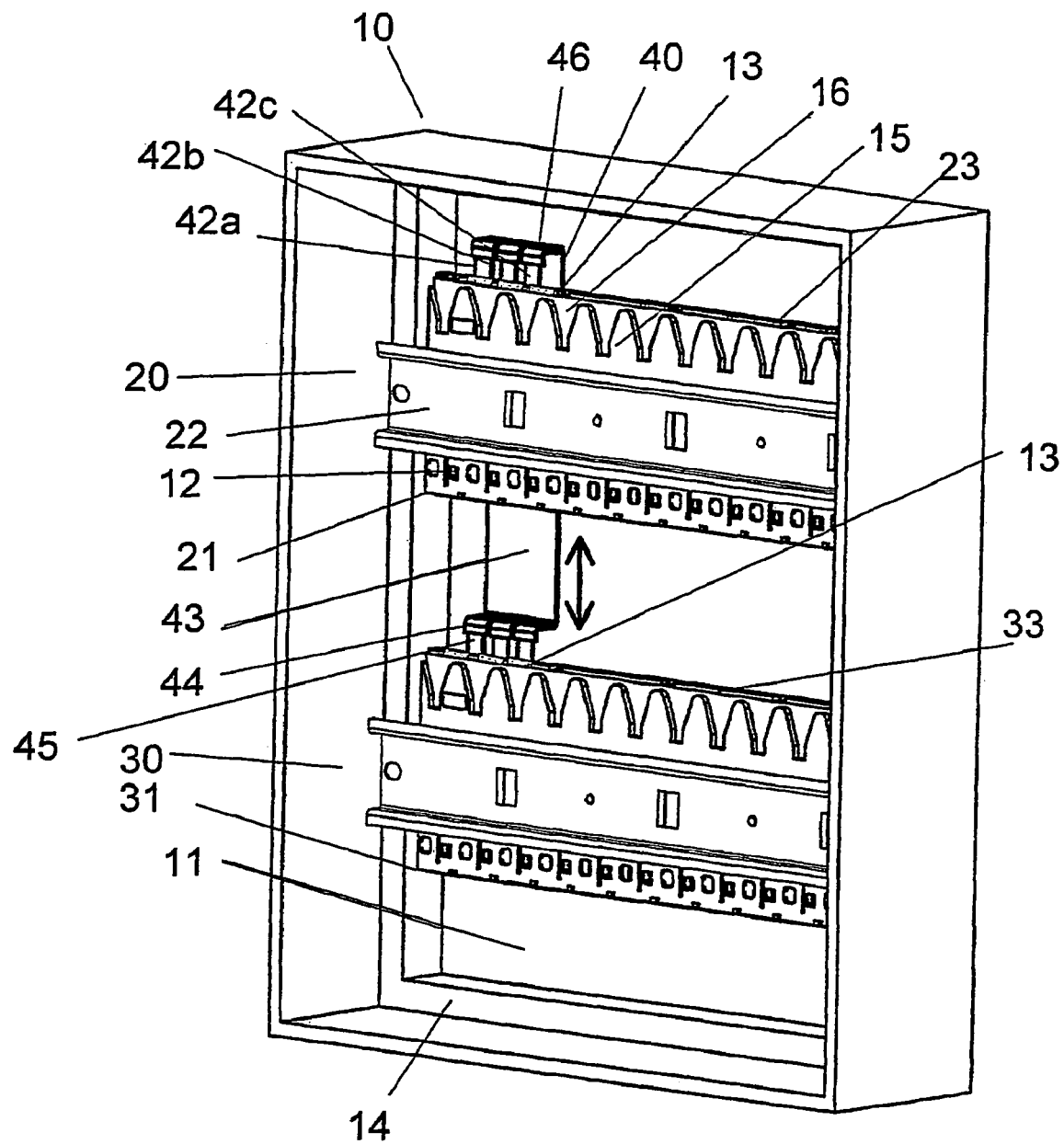

The invention relates to a connection or distribution device which can be built into an installation equipment, preferably a household distribution box, for electrical equipment according to the preamble of claim 1.

Automatic cutouts, fault current cutouts, energy modules or the like are termed electrical installation equipment. The company ABB Stotz-Kontakt GmbH produces and sells such connection and distribution devices under the product name "System Connect". These are for example described in the product catalog "Low voltage material" of ABB Stotz-Kontakt/Striebel & John Vertriebsgesellschaft mbH of the year 2000. In this, in household distribution boxes, the bus bars are accommodated in a basic housing, on which a standard profile bar, preferably a cap profile bar, is installed, which acts to receive the electrical installation equipment and conducts the supplied current by means of energy modules via the bus bars to the individual electrical installation equipment. In particular, such systems are known in which more than one such basic housing is installed in a household distribution box. The current is then passed on from one bus bar to the next by means of line connectors. In the known System Connect, the connection of the bus bars takes place with plug contacts located at the narrow or end sides of the base housing, into which the line connectors are plugged in the horizontal direction. The total construction width of the base housing is increased, since the line connector is passed along laterally near the base housing. Furthermore a subsequent building-in or exchange of the line connector in finished, mounted distribution boxes is not possible because of the space relationships with this lateral placement.

The invention has as its object to provide a connection or distribution device for installation equipments of the kind mentioned at the beginning, in which the disadvantages of the known devices are remedied.

This object is attained according to the invention by the characterizing features of claim 1.

According to the invention, the line connector runs in the interspace between the base housing and back wall of the household distribution box. Connecting contact pieces are provided at both ends of the line connector, and counter contact pieces are located at suitable places on the bus bar, and can be brought into engagement with the connecting contact pieces of the line connector.

The line connector can then be formed as a phase rail block with one or more phase rails, mutually insulated and arranged mutually parallel in their length direction.

The advantage of this arrangement is that the built-in width of the base housing in the household distribution box is now no longer enlarged by the line connectors.

In a particularly advantageous embodiment of the invention, the counter contact pieces provided on the bus bar are designed as plug sockets installed on the upper edge of the base housing. The introduction of the connecting pieces into the counter contact pieces then advantageously takes place in the vertical direction.

According to a further embodiment of the invention, each phase rail has L-form shapes at its upper and lower ends, and their free legs act as connection contact pieces, lie in a common line parallel to the length extension of the phase rail, and point in the same direction. The fixed legs of the L-form shapes run at right angles to the length extension of the phase rail.

The effect of this embodiment is that the connecting plane of the line connectors runs offset relative to the plug plane of the connection contact pieces. This makes possible a particularly simple and also subsequent building-in or exchange of the line connectors in finished, mounted household distribution boxes.

So that too high a plug force does not have to be used on plugging the connection contact pieces into the plug sockets, according to a further advantageous embodiment of the invention the free end edges of the connection pieces are provided with leading-in bevels. Mounting of the connection and distribution device is thereby considerably facilitated.

Further advantageous embodiments and improvements of the invention are to be gathered from the further dependent claims.

The invention, and also further advantageous embodiments and improvements, of the invention, are explained and described in detail using the drawings, in which a few embodiment examples of the invention are shown.

Figures 2, 3:
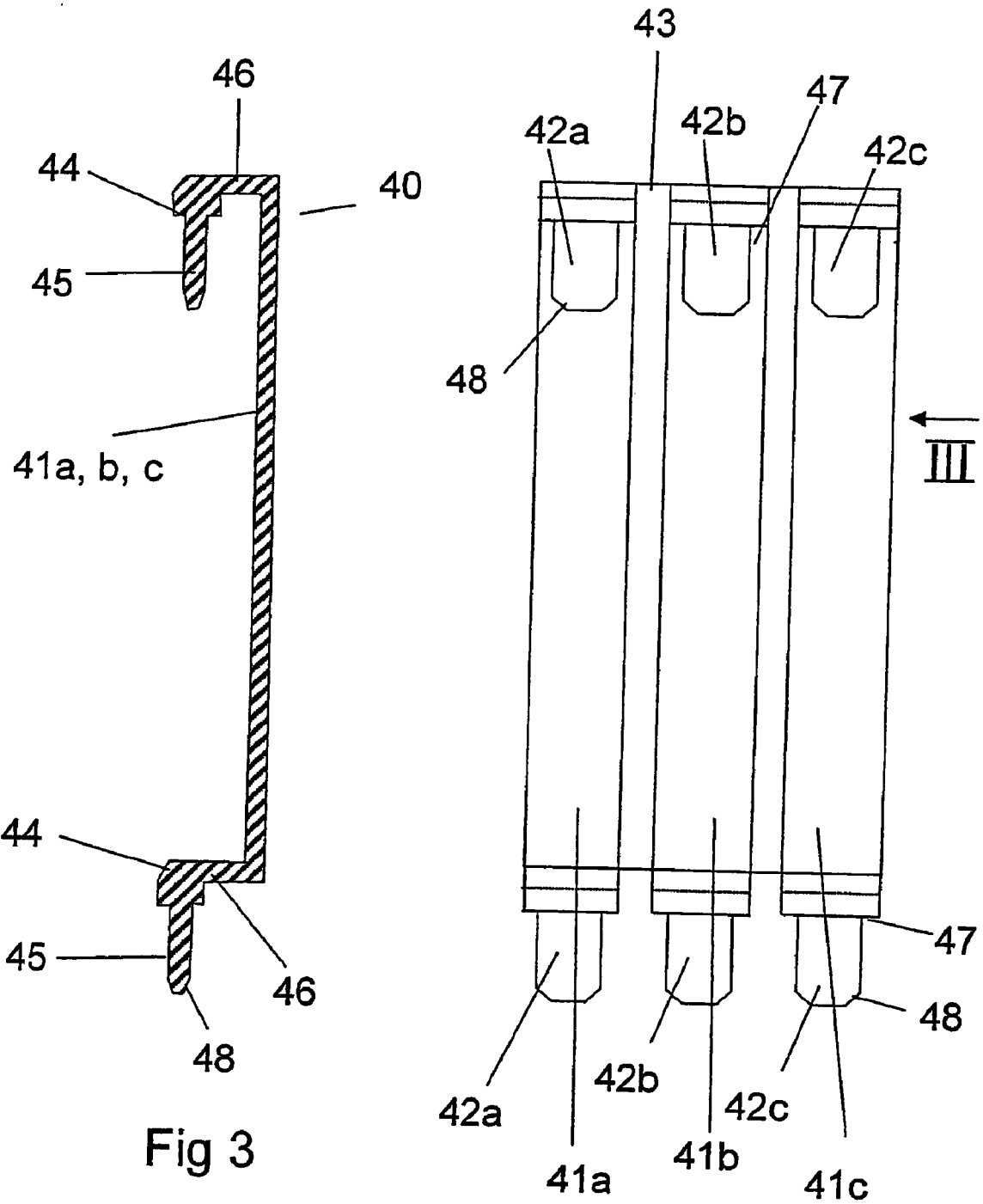
Figure 4:
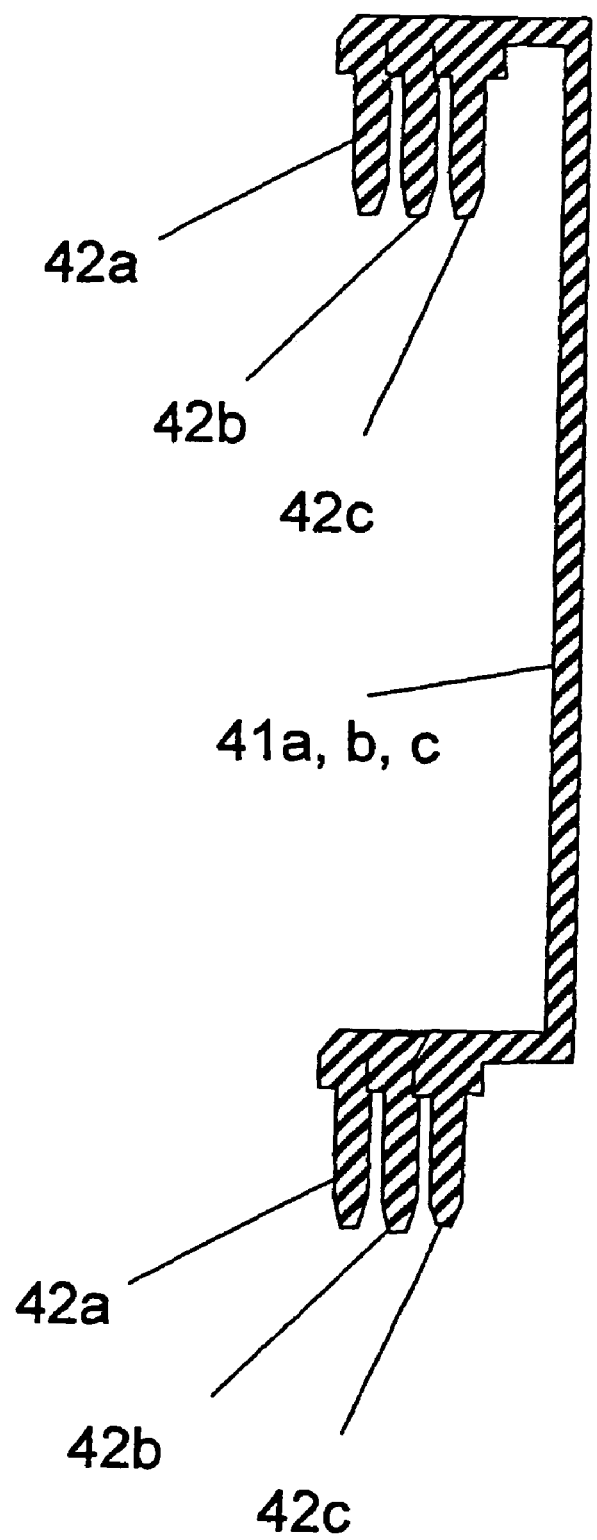

FIG. 1 shows a perspective view of a household distribution box with built-in distribution device, FIG. 2 shows a front view of an embodiment of the line connector according to the invention, FIG. 3 shows a side view of the line connector according to section line III in FIG. 2, FIG. 4 shows a side view of a further design form of the line connector.

FIG. 1 is referred to. This shows a perspective view of a household distribution box 10 with built-in distribution device, consisting of a first base housing 20, a second base housing 30, and an electrical line connector 40. The household distribution box 10 has a back wall 11; it is open on the front side opposite the back wall 11. A mounting frame 14 is set in the rearward region in the household distribution box 10, and the first and second base housings 20 and 30 are fastened thereto, at right angles to the length direction of the household distribution box 10.

A first bus bar 21 is installed in the lower portion of the first base housing 20, and has electrical contacts 12 for receiving the contact pieces of the installation equipment. A first cap profile rail 22 is installed in the middle region of the first base housing 20 and acts to receive the electrical installation equipment. In the upper portion of the side surface of the first base housing remote from the back wall 11, roof-shaped, conically formed shapes 15 and conical recesses 16 therebetween are installed, in which corresponding projections in the electrical installation equipment can engage and by means of which the electrical installation equipments are guided. Plug sockets 13 are provided on the upper narrow side 23 of the first base housing 20, and can be brought into engagement with the three connection contact pieces 42a, 42b and 42c of the electrical line connector 40 can be brought into engagement.

The second base housing 30 is constructed identically to the first base housing; correspondingly, the reference numerals 31 denote the second bus bar, 32 the second cap profile rail, 33 the upper narrow side of the second base housing. Likewise, three plug sockets 13 are provided at the upper narrow side 33 of the second base housing 30. The second base housing 30 is installed in the household distribution box 10 underneath the first base housing 20.

The electrical line connector 40, as shown in FIG. 1, is installed in the interspace between the two base housings 20 and 30 and the back wall 11 of the household distribution box 10. It consists of a phase rail block 43 which has at its upper and lower ends respectively three mutually electrically insulated L-form shapes 44, whose free legs 45 acting as connection contact pieces are located in a common line parallel to the length extension of the phase rail block 43 and point in the same direction, in contrast to which the fixed legs 46 run at right angles to the length extension of the phase rail block. The introduction of the connection contact pieces 42a, 42b and 42c into the plug sockets 13 takes place in the vertical direction is given by the direction arrow in FIG. 1. It is of particular advantage that the electrical line connector 40, also after completed premounting of the household distribution box 10, i.e., after the two base housings 20 and 30 have been fastened to the mounting frame 14, can still be inserted. For this, it is brought into a position such that the upper end of the line connector 40 is located a little under the lower edge of the first base housing 30 then tilted slightly toward the back wall 11 and introduced upward from below into the interspace between the back wall 11 and the base housings 30 and 40, so that the L-form shapes 44 at the upper end slide through behind the first base housing 30 and the L-form shapes formed at the lower end are guided along in front of the second base housing 40.

A preferred embodiment of the electrical line connector 40 is described in detail in FIG. 2. It is designed as a phase rail block 43 with three mutually insulated phase rails 41a, 41b and 41c, arranged mutually parallel in their length direction. The phase rails can, in a particularly advantageous embodiment, be designed as flat band conductors. The lower free end edges of the connection contact pieces 42a, 42b and 42c are provided with insertion bevels 48, so that introduction into the plug sockets 13 is facilitated. So that there is a secure electrical separation the connection contacts 42a, 42b and 42c are again mutually insulated by releases 47.

FIG. 3 shows a side view of the line connector 40 according to the arrow direction III. The free leg 45 of the L-form shapes 44 installed above and below on the phase rail, and thus also the connection contact pieces 42a, 42b and 42c of the phase rail block, lie in a common plane, parallel to the longitudinal extension of the phase rails 41a, 41b, 41c.

A further embodiment of the line connector 40 is shown in a side view in FIG. 4. Here the connection contact pieces 42a, 42b and 42c belonging to the different phase rails 41a, 41b and 41c are arranged mutually offset in a direction at right angles to the length extension of the phase rail block 43. In this embodiment, the plug sockets 13 are then also arranged on the upper offset narrow side 23 of the base housing 20 in corresponding planes parallel to the back wall 11 of the household distribution box 10, so that the electrical contacting occurs by vertical introduction of the contact pieces 42a, 42b and 42c into the plug sockets 13. The introduction of the line connector 40 into the interspace between the back wall 11 and the first and second base housings 30 and 40 after completed pre-mounting of the housing distribution box 10 takes place in the manner described above.

The invention claimed is:

1. A distubution device which can be built into a household distribution box for receiving electrical installation equipments, comprising:
    a first base housing in which at least one first bus bar is accommodated and on which a first profile assembly rail is installed, wherein the electrical installation equipments can be latched to the first profile assembly rail; and
    at least one second base housing which lies in a plane parallel to a back wall of the household distribution box under or over the first base housing, in which at least a second bus bar is accommodated and on which a second profile assembly rail is installed, wherein the electrical installation equipments can be latched to the second profile assembly rail; and
    at least one electrical line connector with which the at least one first bus bar and the at least one second bus bar can be electrically connected, wherein the line connector is arranged in an interspace between a base housing and the back wall of the household distribution box; wherein connection contact pieces are provided at both ends of the line connector; and wherein counter contact pieces are provided on a bus bar, and cooperate with the connection contact pieces of the line connector.

2. The device according to claim 1, wherein the line connector is constituted as a phase rail block with one or more mutually insulated phase rails arranged mutually parallel in its length extension direction.

3. The device according to claim 2, wherein the counter contact pieces provided on the bus bar are designed as plug sockets installed on the upper edge of the bus bar.

4. The device according to claim 3, wherein each phase rail has L-form shapes at its upper and lower ends, their free legs acting as connecting contacts lying in a common line parallel to a length extension of the phase rail, and their fixed legs run at right angles to the phase rail.

5. The device according to claim 4, wherein the connection contact pieces of all phase rails are mutually offset and lie in a common plane parallel to the length extension of the phase rail.

6. The device according to claim 4, wherein the connection contact pieces belonging to different phase rails are arranged mutually offset in a direction at right angles to the length extension of the phase rail.

7. The device according to claim 4, wherein the connection contact pieces are vertically introduced.

8. The device according to claim 1, wherein free end edges of the connection contact pieces are provided with introduction bevels for the purpose of easier introduction into the counter contact pieces.

9. The device according to claim 1, wherein the connection contact pieces are mutually spaced by releases to secure electrical separations.

10. The device according to claim 2, wherein the phase rails are formed as flat band conductors.

11. The device as claimed in claim 1, wherein the electrical installation equipments are chosen from a group consisting of an automatic cutout, a fault current cutout, and an energy module.

12. The device as claimed in claim 1, wherein the distribution device is either a connection device or a distribution equipment for electrical installation equipments.

13. The device as claimed in claim 1, wherein the first and second profile assembly rails are each a cap profile rail.

14. The device as claimed in claim 1, the installation equipments can be brought into electrical contact with an assembly rail when snapped on to the first or the second bus bar.

* * * * *